No. 819,685.

P. YOE.
VOTING MACHINE.
APPLICATION FILED AUG. 16, 1905.

PATENTED MAY 1, 1906.

WITNESSES

Philip Yoe
INVENTOR.
ATTORNEY.

No. 819,685. PATENTED MAY 1, 1906.
P. YOE.
VOTING MACHINE.
APPLICATION FILED AUG. 16, 1905.

WITNESSES.
Matthew Subler
J. Fred Hemberger Philip Yoe, INVENTOR
By R. J. McCarty ATTORNEY

No. 819,685. PATENTED MAY 1, 1906.
P. YOE.
VOTING MACHINE.
APPLICATION FILED AUG. 16, 1905.

WITNESSES
Matthew Subler
J. Fred Hemberger

INVENTOR
Philip Yoe
By R. J. McCarty
ATTORNEY

No. 819,685. PATENTED MAY 1, 1906.
P. YOE.
VOTING MACHINE.
APPLICATION FILED AUG. 16, 1905.

WITNESSES.

INVENTOR.
ATTORNEY.

No. 819,685. PATENTED MAY 1, 1906.
P. YOE.
VOTING MACHINE.
APPLICATION FILED AUG. 16, 1905.

WITNESSES
INVENTOR Philip Yoe
ATTORNEY

UNITED STATES PATENT OFFICE.

PHILIP YOE, OF DAYTON, OHIO, ASSIGNOR TO PHILIP YOE, EDWARD W. HANLEY, AND KERIEN FITZPATRICK, OF DAYTON, OHIO.

VOTING-MACHINE.

No. 819,685.  Specification of Letters Patent.  Patented May 1, 1906.

Application filed August 16, 1905. Serial No. 274,358.

*To all whom it may concern:*

Be it known that I, PHILIP YOE, a citizen of the United States, residing at Dayton, in the county of Montgomery and State of Ohio, have invented certain new and useful Improvements in Voting-Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in voting-machines.

The primary object of the invention is to provide means whereby a rotary movement is obtained for actuating the counters that record the individual votes.

Further objects of the invention are to dispense with the use of springs, screws, &c., which are more or less liable to be affected through the constant operations of the machine, and consequently become a source of annoyance.

A further object of the invention is to provide a machine of the above type which is comparatively devoid of complications in its mechanical construction, is light in weight, and easy to manipulate, and is also positive in its operations in recording the vote. The actuating mechanism is in constant mechanical engagement with the counters.

To the above ends the invention is an improvement of the voting-machine shown and described in Letters Patent granted to me February 16, 1904, No. 752,276.

Preceding a detailed description of the invention, reference is made to the accompanying drawings, of which—

Fig. 5, Sheet 4, is a detail of the key-resetting frame in another position. The latter view shows the position of the frame when the keys are locked, while Fig. 4 shows the position of the frame when the keys are unlocked and ready for voting. Fig. 10, Sheet 4, is a detail view of the independent setting-keys in a voting position, the card being in the orifice. Fig. 11, Sheet 4, is a detail view of a setting-key and the actuating-frame. Fig. 12, Sheet 4, is a detail of the setting-key and the counter-actuators. Fig. 17 is a detail of the interlocking mechanism.

In a detailed description of the invention similar reference characters indicate corresponding parts.

Figure 1:
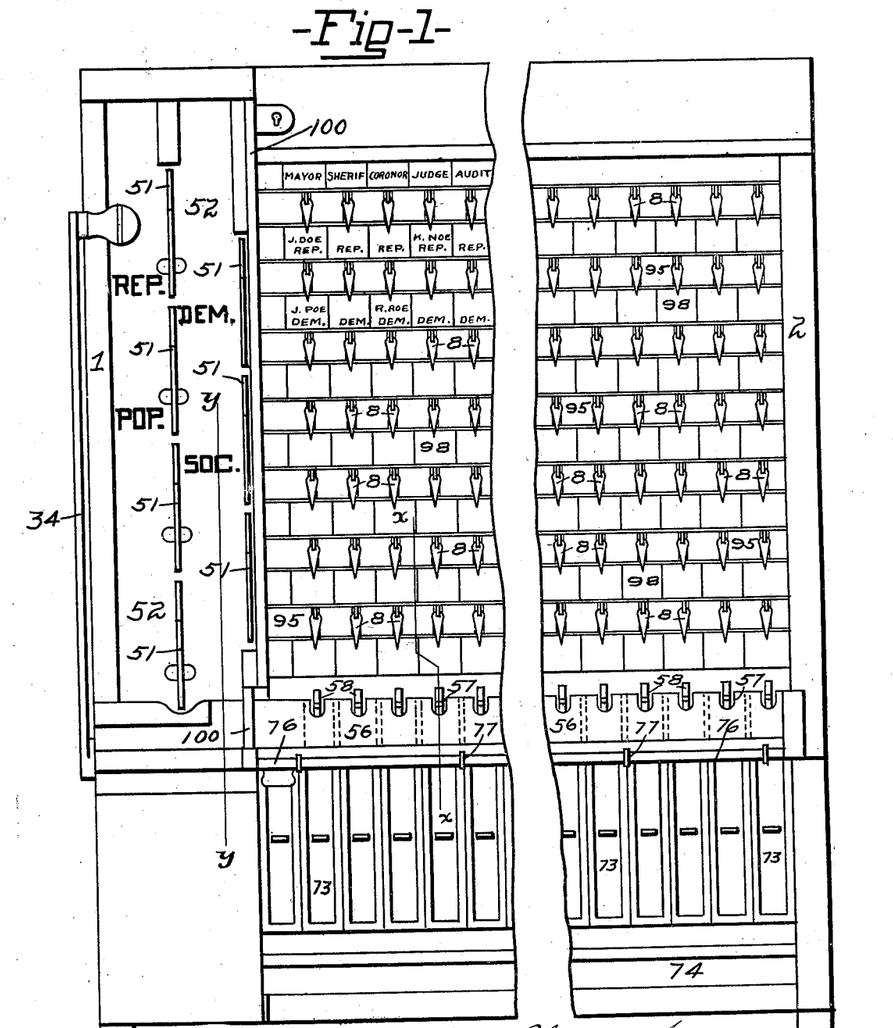
Figure 1 is a front elevation of the machine, parts broken away to facilitate the illustration and the booth being removed.
Figures 5, 10, 11, 12, 17:
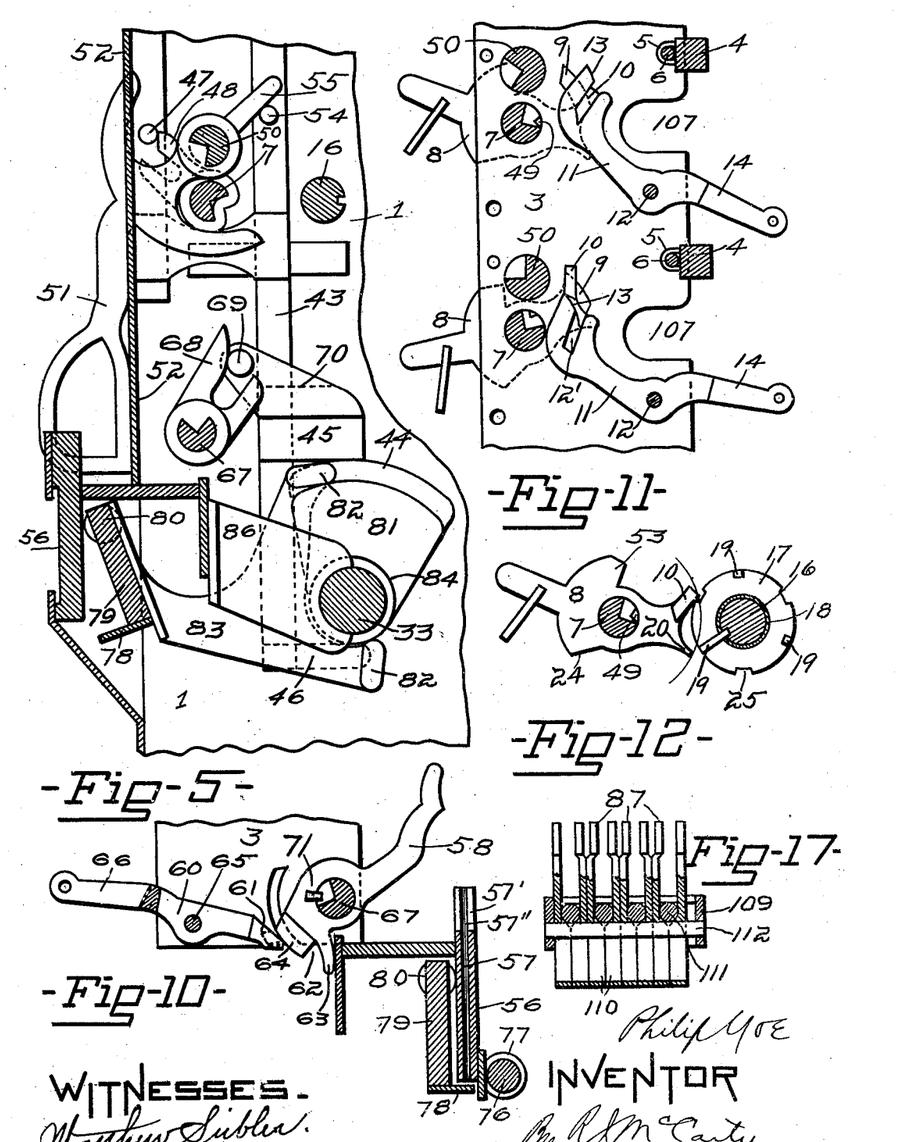
Figure 6:
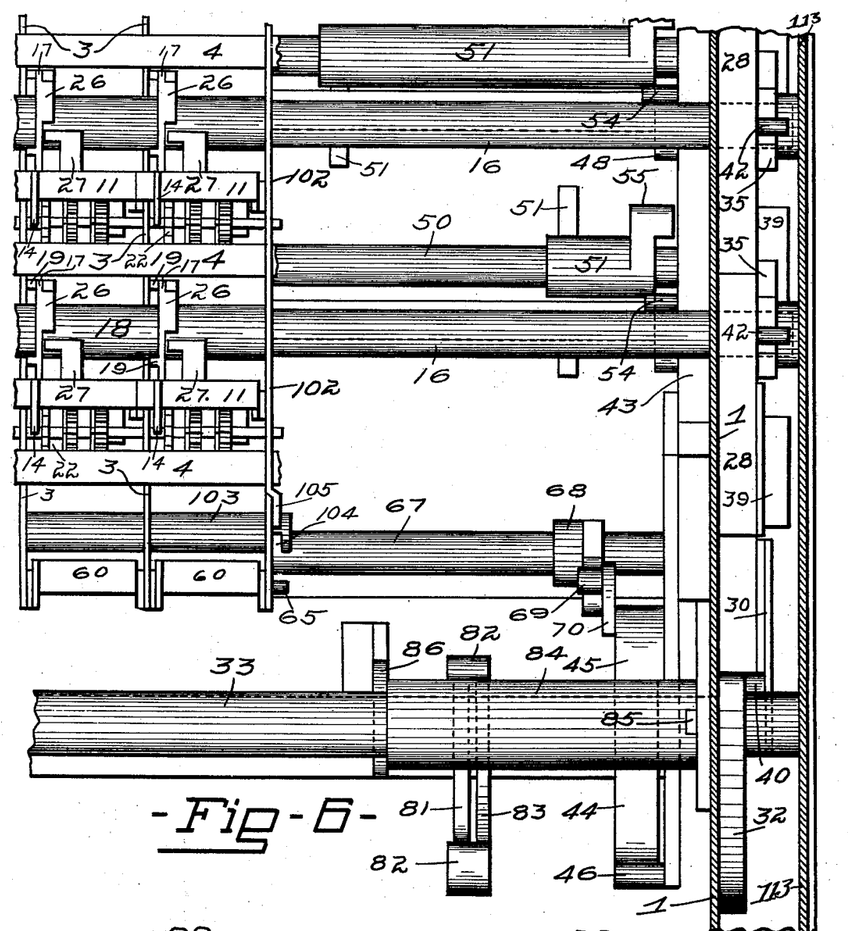
Fig. 6, Sheet 5, is a partial rear view of the machine.

*Framework.*—Referring to Fig. 1, Sheet 1, and Fig. 6, Sheet 5, 1 and 2, respectively, designate the side frames, between which are suitably mounted division-plates 3. The division-plates 3 are supported by cross-bars 4, which have their bearings in the side frames 1 and 2. Said division-plates 3 and cross-bars 4 form a multiplicity of divisions between which the counters 22 on shafts 21 are mounted, as shown in Fig. 6, Sheet 5. The cross-bars 4 are attached to the division-plates 3 by staples 5 and rods 6, as shown in Fig. 11, Sheet 4. The plates 3 rest in slots in the bars 4, and said rods 6 pass through holes in the plates 3. The staples 5 hold the rods 6 firmly against the cross-bars 4, thereby forming a rigid connection between the cross-bars 4 and the division-plates 3, and the parts are easily assembled. The division-plates 3 are further supported by rod 103' at the top of the machine. (See Fig. 15, Sheet 3.)

*Single-candidate-setting key.*—Extending through the machine and mounted in the side frames 1 and 2 and the division-plates 3 are channel-shafts 7, upon which are mounted the single or individual candidate-setting keys 8. Extending from these keys 8 and projecting through curved slots 9 in the division-plates 3 are lugs 10, which engage the interlocking actuating-frames 11, said frames being fulcrumed on the rods 12, that extend through the division-plates 3. When a setting-key is in its normal position or is not set, the lug 10 lies within the cam-slot 12' of the frame 11, as shown by the upper frame in Fig. 11, Sheet 4; but upon said key 8 being moved by the voter to its set position or depressed the lug 10 rides out of the cam-slot 12' onto the radial surface 13 of the frame 11, as shown by the lower key in Fig. 11, thereby depressing said frame and elevating the projection 14 on said frame. When the lug 10 lies within the cam-slot 12' of the frame 11 and the frame is locked in this upper position by means hereinafter described, the key 8 is also locked in its position, as the lug 10 cannot ride out of the slots 12' without actuating the frame 11, and when the lug 10 rests upon the radial portion 13 of the frame 11 and said frame 11 is locked by said means hereinafter described the key 8 is also locked, as the lug 10 cannot ride off of the radial portion 13 into the cam-slot 12' without actuating the frame 11.

It will be seen that when the frame 11 is locked in either its upper or lower position the key 8 will also be locked in its respective position. When the setting-key 8 is returned to its unset or normal position, the lug 10 rides into the slot 12' as the frame 11 ascends, owing to the weight of the interlocking mechanism hung on the projection 14. It will also be noted the weight of the interlocking mechanism having a tendency to force the actuating-frame 11 upward will hold the setting-key 8 in either its set or unset position when the frame 11 is not locked.

*Interlocking mechanism.*—Extending from each of the frames 11 is an arm 14, which has connected thereto interlocking rods 15, which actuate interlocking members 87. (Shown and described in my Letters Patent No. 794,914, of July 18, 1905.) The interlocking mechanism is shown in Fig. 17, Sheet 4, and briefly described as follows: Below each vertical series of counters is a series or bank of interlocking members 87, which are connected to the actuating-frames 11 by the interlocking rods 15 and the arms 14. The interlocking devices are operated through connecting-rods 15, each of which has a loop on its lower end by means of which it is coupled with its respective interlocking members. The bank of interlocking members shown in Fig. 17 has abutment-frame 109 and eight interlocking members 87, each of which has an enlargement 110 lying on opposite sides of rollers 111. Owing to the amount of space allowed by the abutment-frame 109 only one interlocking member 87 can be elevated at a time. The shaft 112 holds the members 87 in their assembled positions.

Figure 13:
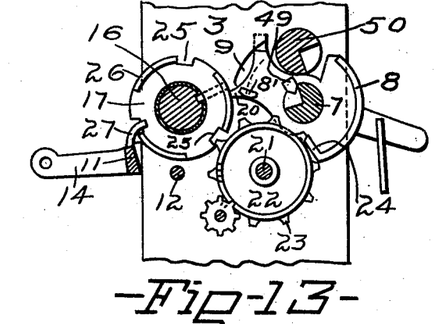
Fig. 13, Sheet 6, is a detail of one of the counters. The setting-key has been acted upon by the rotary counter-actuator.

*Counters.*—Extending through the machine and through side frames 1 and 2 and the division-plates 3 are rotating shafts 16, upon which are mounted the counter-actuators 17. These counter-actuators 17 are held in position on shaft 16 by spacers 18. Upon one side of the counter-actuators 17 are lugs 19, (see Fig. 12, Sheet 4,) which engage the projection 20 on key 8 when any one of said keys is thrown in a voting position, and the counter-actuator is revolved by means hereinafter described. These actuators 17 operate the counters as follows: Mounted between the division-plates 3 on rods or shafts 21 are the units counter-wheels 22, having ten teeth 23. (See Fig. 9, Sheet 7, and Fig. 13, Sheet 6.) When a setting-key is depressed or set in a voting position, as shown by the upper key in Fig. 9, it is positively stopped by the cam-surface 24 on key 8 engaging one of the teeth 23 on said counting-wheel 22. In this position the end 20 of the key 8 has been thrown in the path of the lug 19 on actuator 17, (see Fig. 12,) and upon the counter-actuator 17 being revolved and the lug 19 engaging the end 20 of the key 8 the cam-surface 24 on key 8 depresses one of the teeth 23, revolving the units-wheel 22 to a small extent, thereby forcing one of the teeth 23 into one of the recesses 25 of the counter-actuator 17. (See Fig. 13.) It will be noted that the counter-actuator has revolved a sufficient distance in actuating the key 8 to depress one of the teeth 23 for one of the notches 25 to come opposite to one of the teeth 23, thereby allowing said tooth to enter said notch. When the said actuator is further revolved and the lug 19 riding past the end 20 of the key 8, the recess 25 carries one of the teeth 23 a sufficient distance for the units-wheel of the counters to complete one-tenth of a revolution. As two of the teeth 23 of the units-wheel 28 engage the peripheries of the counter-actuators 17 when said counter-actuators are at rest, the units-wheel will be locked by said counter-actuator except only when the counter-actuator is revolving. The counter-actuators 17 are made to revolve one-third of a revolution at each registration. In transferring from the units-wheel to the tens-wheel and from the tens-wheel to the hundreds-wheel I employ any well-known means. It will be understood that all the counter-actuators make a part revolution at each registration; but only such counters whose keys are set are actuated. The keys are returned to their normal or unset position (by means hereinafter described) simultaneously with the actuation of the units-counters by the counter-actuators. It will be seen that if a setting-key 8 is not set the end 20 will not be thrown in the path of the lugs 19 of the counter-actuators 17, and as a consequence the counters will not be actuated.

To prevent a setting-key 8 from being depressed while the counter-actuators 17 are revolving, I provide upon the said counter-actuators a plurality of ribs 26. (See Fig. 9, Sheet 7, and Fig. 6, Sheet 5.) Mounted upon each of the actuating-frames 11 is an angular projection 27, which passes under the ribs 26 when a setting-key 8 is depressed. If a counter-actuator is then revolved, one of the ribs 26 thereon passes in the path of the projection 27, thereby locking the actuating-frame 11 in its set position, and, similarly, if a setting-key 8 is not depressed, the said rib 26 will lie in the path of the projection 27, thereby locking the actuating-frame in its unset position. It will be seen that in whatever position a setting-key 8 is placed at the beginning of the part revolution of a counter-actuator 17 it must so remain until said counter-actuator has finished its movement, as the actuating-frame 11 is locked in either position by means of the ribs 26 and projection 27, and the key 8 is locked by the lug 10 resting in cam-slot 12' or on the radial surface 13, as before described. Mounted upon each of the setting-keys 8 is a lug 8', which enters the recesses between the teeth 23 of the units-counters 22. (See lower key 8 in Fig. 9.) As the setting-keys are locked by means of the ribs 26 and the projection 27, as before described, it will be clearly understood that the counters of all unset keys are locked by the lug 8' while the counter-actuators are revolving.

Figure 2:
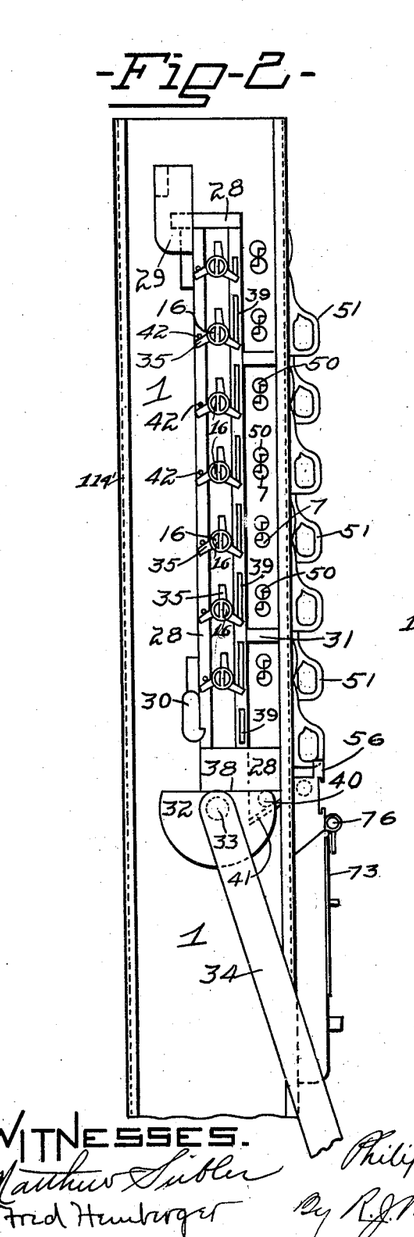
Figs. 2 and 3, Sheet 2, are views of the left-hand end of the machine, showing the reciprocating actuating-frame in different positions.
Figure 3:
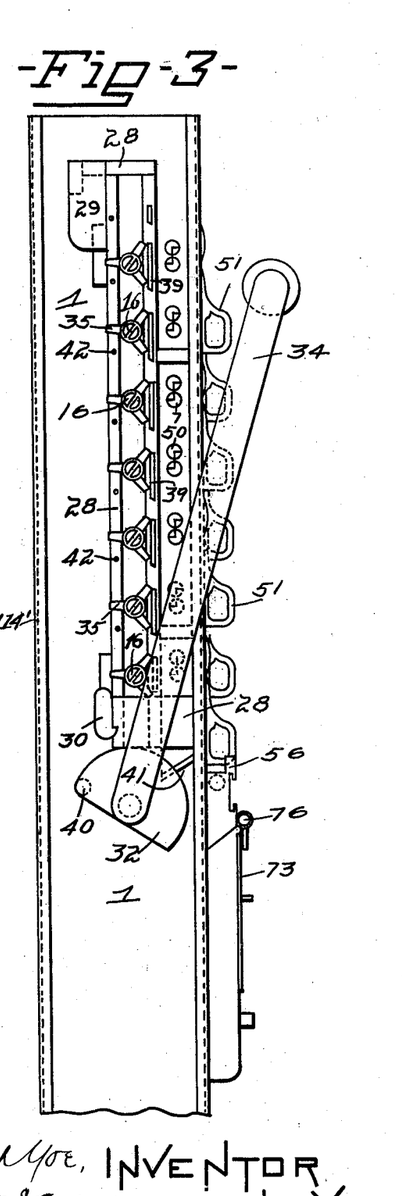

The mechanism which imparts movement to the rotating shafts 16, upon which the counter-actuators 17 are mounted, is described as follows:

*Rotating shaft - actuating mechanism.*—Mounted upon the outside of the side frame 1 and having bearings thereon is a reciprocating actuating-frame 28. (Shown in Figs. 2 and 3, Sheet 2.) This actuating-frame is held in close contact with the side frame 1 by guides 29, 30, and 31. The said actuating-frame 28 receives reciprocating motion from a cam 32 on the main actuating-shaft 33, which has bearings in the side frames 1 and 2. The shaft 33 supports an operating-lever 34, by which said shaft is actuated by the voter upon entering and leaving the booth. Fig. 2 shows the position of the lever 34 when the voter is within the booth, (not shown,) and Fig. 3 the position of said lever when the booth is empty. It will be understood that on entering the booth the voter lowers the lever 34, and upon leaving the booth he raises said lever, and it is during this upward movement of the lever that the counters are actuated. Mounted upon the ends of the shafts 16 are star-wheels having three prongs 35, which engage projections 39 and 42 on the actuating-frame 28 to rotate the shafts as follows: When the operating-lever 34 is raised from the position shown in Fig. 2 to that shown in Fig. 3, the cam-surface of the cam 32 rides on the lower surface 38 of the frame 28, thereby raising the same. During this movement projections 39 from the frame 28 strike the right-hand spur or prong 35 of the star-wheels, and thereby cause the star-wheels engaged to rotate until they reach the position shown in Fig. 3. It will be noted that in this position there are two of the prongs 35 in contact with the projections 39. This forms a lock for the star-wheels or for the shafts 16 through the star-wheels, whereby it is impossible for said shafts to rotate from any other cause than that given it by the frame 28. When the operating-lever 34 is lowered, which occurs when the voter enters the booth, the frame 28 descends as the pin 40 engages the projection 41 on said frame. The pin 40 is on the inner face of the cam 32. In this movement the pins 42 on the frame 28 strike the adjacent prongs 35 of the star-wheels, and thereby causes said wheels and the shafts 16 to rotate. The movement given said star-wheels when the frame 28 is descending is not as great as that given said wheels when the frame is ascending. The reason for this is that the counters are actuated when said frame 28 ascends or when the voter leaves the booth, and owing to the spacing of the various elements on the counter-actuators 17 the said actuators work idly during the slight movement given the shafts 16 and the star-wheels during the descending movement of the frame 28. This slight movement of the star-wheels is necessary to bring the prongs 35 to their original position to be engaged by the projections 39.

Figure 9:
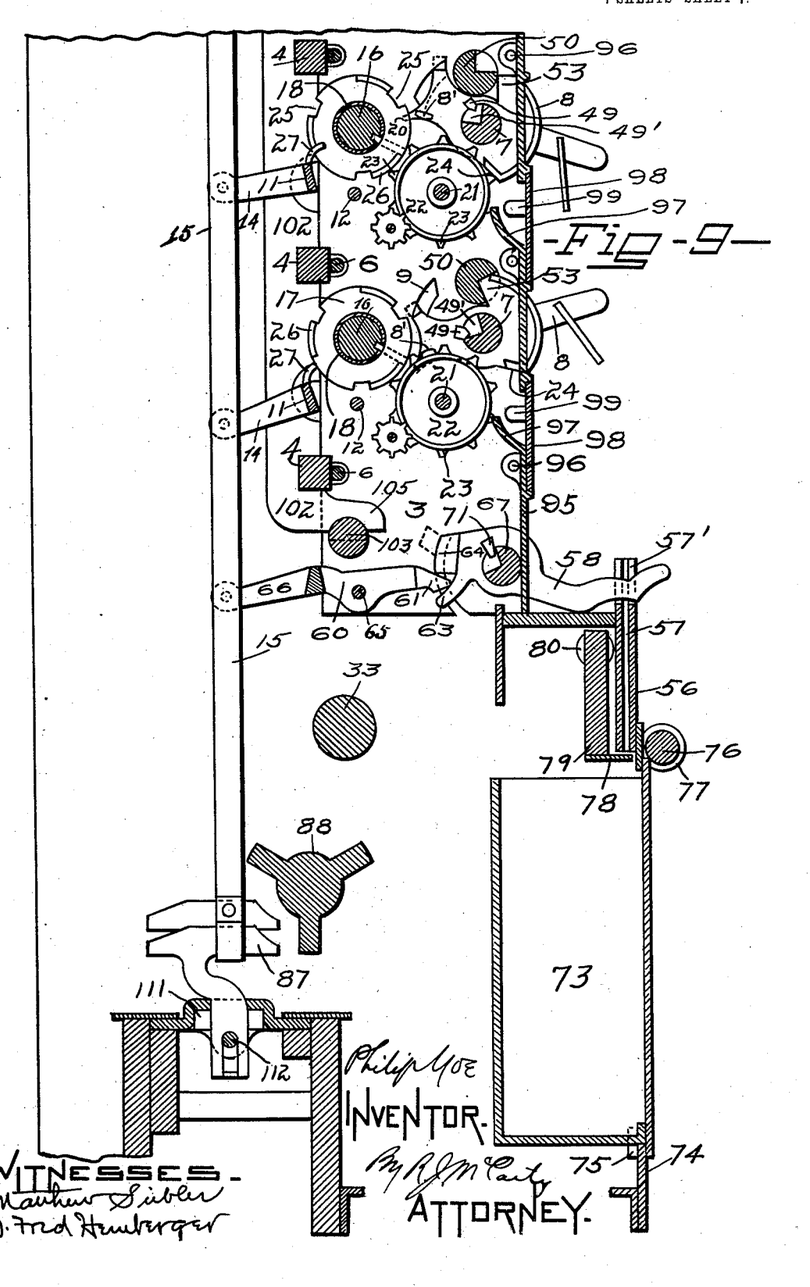
Fig. 9, Sheet 7, is a sectional view on the line $x\ x$ of Fig. 1.

*Key-resetting mechanism.*—As hereinbefore stated, the setting-keys 8 are mounted upon channel-shafts 7. These shafts 7 are instrumental in returning said keys to their normal or "out-of-voting" position. The means for actuating said shafts are as follows: Referring to Fig. 1, Sheet 3, Fig. 5, Sheet 4, and Fig. 6, Sheet 5, mounted upon the inner side of the end frame 1 is a key-resetting frame 43, which is given movement by a cam 44 on the main actuating-shaft 33, alternately engaging projections 45 and 46 on said frame 43. Mounted upon the frame 43 are pins 47, which engage slotted actuators 48 on the channel-shafts 7. Upon the upward movement of the frame 43 said pins 47 engage the upper arm of the slotted actuators 48, thereby rocking the shafts 7. It will be noted from Fig. 5, Sheet 4, that owing to the construction of the upper arm of the slotted actuators 48 the pins 47 will ride past the slot in said actuator. This excess of movement is necessary, as the frame 43 also resets the straight-ticket-setting keys, in which a larger movement is required than is required of the individual setting-keys. Referring to Fig. 9, Sheet 7, also Fig. 13 on Sheet 6, 49 designates a lug on the setting-keys 8, engaged by the slotted or channeled portion 49' of the channel-shafts 7. Upon said channel-shafts 7 being rocked the keys 8 are carried back to their normal positions. When the shafts 7 are in the position shown in Fig. 5, (the keys 8 being then in normal position,) the channeled portion of said shaft is held rigidly against the lugs 49 on the keys 8 by the pin 47 on frame 43 engaging the upper prong of the slotted actuator 48, thereby locking all the keys 8 on that shaft in their normal or out-of-voting position. As before stated, the voter lowers the lever 34 on entering the booth. This operation unlocks the keys 8, as the pin on the frame 43 engages the slotted actuator 48 on the slotted shaft 7, thereby receding the channeled portion of said shafts 7 from the lugs 49 on the setting-keys 8, and similarly on leaving the booth the lever 34 and resetting-frame 42 are raised, thereby resetting the keys and locking them, as above described. It will be seen that the keys are unlocked only when the lever is in its lower position and the voter is within the booth.

Figure 4:
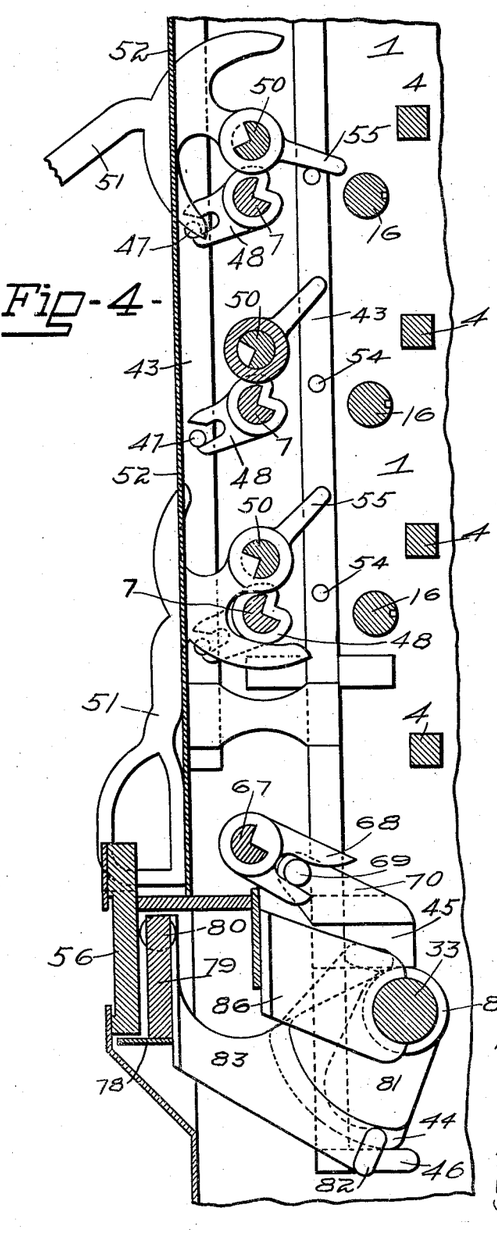
Fig. 4, Sheet 3, is a detail of the key-resetting frame on line $y\ y$ of Fig. 1.

*Straight-ticket keys.*—In the construction of the machine I place all the candidate-keys for one party in a horizontal line, and the means I employ for voting a straight ticket will now be described. Mounted in the side frames 1 and 2 and extending through the division-plates 3 are channel-shafts 50. At the left side of the machine and slid upon said channel-shafts 50 are the straight-ticket keys 51, Fig. 1, Sheet 1, Fig. 4, Sheet 3, and Fig. 5, Sheet 4, and Fig. 6, Sheet 5. These keys 51 project through the front casing 52 and are thus accessible to the voter. In voting a straight ticket a key 51 is placed in the position shown by the upper key 51 in Fig. 4, Sheet 3. This movement of said key 51 oscillates the channel-shafts 50. The channeled portion of said shafts engages the setting-key 8 at the point 53, thereby tilting the keys from normal position to a voting position. (See upper key in Fig. 9.) As all of the individual setting-keys of one party are engaged by the straight-ticket channel-shafts 50 of that party, all of the individual setting-keys of that party will be thrown in a voting position when the straight-ticket key of that party is set. In order to return the straight-ticket key 51 to its normal position, I provide upon the key-resetting frame 43 pins 54, which engage projections 55 of the straight-ticket keys 51 when the frame 43 ascends.

*Independent - voting mechanism.* — This mechanism is the subject-matter of another application and will be briefly described. Extending across the lower portion of the machine is a cross-frame 56, having orifices 57, through which the cards 57'' for the independent candidates are deposited. Above each orifice 57 is mounted an independent setting-key 58. (See Fig. 1, Sheet 1, Fig. 9, Sheet 7, and Fig. 10, Sheet 4.) These keys 58 are pivoted on channeled shafts 67, which have bearings in the side frames 1 and 2 and the division-plates 3. It will be noted from Fig. 10 that it is necessary to raise the key in order to deposit a card 57''. This movement actuates the independent interlocking actuating-frame 60 as follows: When the independent-setting keys 58 are in their normal position, as shown in Fig. 9, Sheet 7, the projection 61 of the independent interlocking actuating-frame 60 lies within the notch 62, formed by the projection 63 and the radial portion 64 of the keys 58. When a key 58 is raised to the position shown in Fig. 10, Sheet 4, the projection 61 on the frame 60 is lowered and rides along the radial portion 64. As the frame 60 is pivoted on rod 65, which extends through the division-plates 3, the outer end 66 of said frame will be raised, thereby actuating the interlocking mechanism shown in Fig. 17, Sheet 4. As the portion 64 of a key 58 is radial, the frame 60 is locked in that position. The keys 58 are returned to their normal positions by a channel-shaft 67 similarly to the setting-keys 8. Mounted upon said channel-shafts 67 is a slotted actuator 68. (See Figs. 4 and 5, Sheets 3 and 4.) This slotted actuator is engaged by a pin 69 on the projection 70 of the frame 43, and when said frame 43 is operated by the means heretofore described the channel-shaft 67 is rocked, and the channel portion of said shaft engages the lug 71 of those keys 58 that have been set in an orifice-opening position, as shown in Fig. 10, Sheet 4, thereby resetting the keys 58 to their normal positions. When the frame 43 is in the position shown in Fig. 5, the channel portion of the shaft 67 engages all of the lugs 71 of the keys 58 and holds them in a locked position. In this position the main operating-lever 34 is up and the setting-keys are in their normal position.

Mounted below the orifices 57 are card-receivers 73, supported on a plate 74. These receivers 73 are held in position on the plate 74 by notched lugs 75 and at the top are locked in position by rod 76, slidingly mounted in rings 77 on bar 56. The rod 76 is itself locked in position by means hereinafter described. (See Figs. 1 and 9.) Immediately below the orifices 57 is a stop-plate 78, mounted on the oscillating cross-bar 79, said bar 79 being pivoted at 80 on the frames 1 and 2. This bar 79 is given an oscillating motion to allow the cards to be injected into the receivers 73 by the independent setting-keys 58 when the main actuating-lever 34 is raised or when the voter leaves the booth by the following mechanism: Mounted on the main actuating-shaft 33 is a cam 81, which engages lugs 82 on the arm 83 on the bar 79. When said shaft 33 is oscillated, the bar 79 recedes from the bar 56, and thereby allows any card that may be in the orifices 57 to be injected into the card-receivers 73. A card cannot be inserted in the orifices 57 when a key 58 is locked, as shown in Fig. 9. When a key 58 is in the position shown in Fig. 10, a card being deposited in the orifices it will be observed that the setting-key cannot be fully returned, owing to its coming in contact with the card. Therefore the interlocking mechanism (shown in Fig. 17) cannot be unlocked. The finger-recesses 57' in cross-bar 56 forms a convenient means whereby a voter may extract the card from the orifice and change his vote. The cams 44 and 81 are mounted on a sleeve 84, keyed to the main operating-shaft 33 by pin 85. (See Fig. 6, Sheet 5.) The said sleeve 84 is held in contact with this pin 85 by the arm 86, which is mounted on the framework. By this means I am enabled to assemble the parts without the aid of screws or their equivalents.

Figure 14:
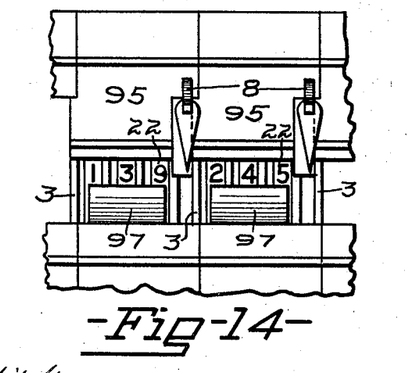
Fig. 14, Sheet 6, is a front view of the counters.
Figure 16:
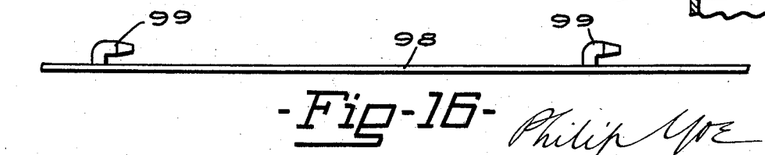
Fig. 16, Sheet 5, is a detail view of the plate upon which the names of the candidates are exhibited.

*Ballot-board.*—Mounted in the front of each counter, between the division-plates 3, are plates 96, which are detachably fastened by wires 96. (See Fig. 9, Sheet 7, and Fig. 14, Sheet 6.) These plates 95 have projections 97, the edges of which are in close proximity to the counting-wheels and form a line by which the counters may be easily read. (See Fig. 14, Sheet 6.) Lying across the machine, between the plates 95, is a plate 98, upon which names of the candidates are placed. These plates 98 have hooks 99, that engage openings in the division-plates 3. (See Fig. 16, Sheet 5.) These plates 98 and the front casing 52 form the ballot-board of the machine. The said plates 98 may be removed to view the counters by unlocking the bar 100 (shown in Fig. 1) and giving said plates a movement to the left, thereby disengaging them from the division-plates 3. The bar 100 also locks the rod 76 of the card-receivers. After being unlocked the bar 100 allows the rod 76 to be removed, thereby allowing a removal of the card-receivers.

Figure 15:
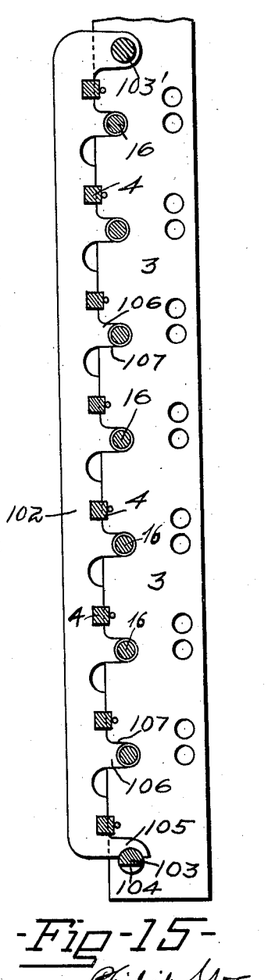
Fig. 15, Sheet 3, is a detail of the split bearing by means of which the counters are enabled to be returned to zero.

*Setting to zero.*—Referring to Fig. 15, Sheet 3, 102 designates a plate which forms a split bearing for the rotating counter-actuating shaft 16. As the counter-actuators 17 form locks for the unit-counters 22, it is necessary to provide a yielding bearing for the shafts 16 when the counters are set to zero. The bearing-plate 102 is pivoted at the top of the machine on the rod 103', said rod extending through the division-plates 3. At the bottom of said plates 102 is a rod 103, which locks all of said plates in the position shown in Fig. 15. This rod 103 has notches 104, which allow the ends 105 of the plates 102 to be thrown into a position to be locked simultaneously. These plates 102 have lateral projections 106, which fit into notches 107 in the division-plates 3. The projections 106 and the notches 107 form rigid bearings for the counter-actuating shafts 16 when the plates 102 are locked in position by the rod 103. In setting the counters to zero the plates 102 are unlocked by the rod 103 and thrown outward, thus allowing a yielding movement to the counter-actuators 17 when the counters 22 are rotated by the fingers or other means to be set to zero.

Figure 7:
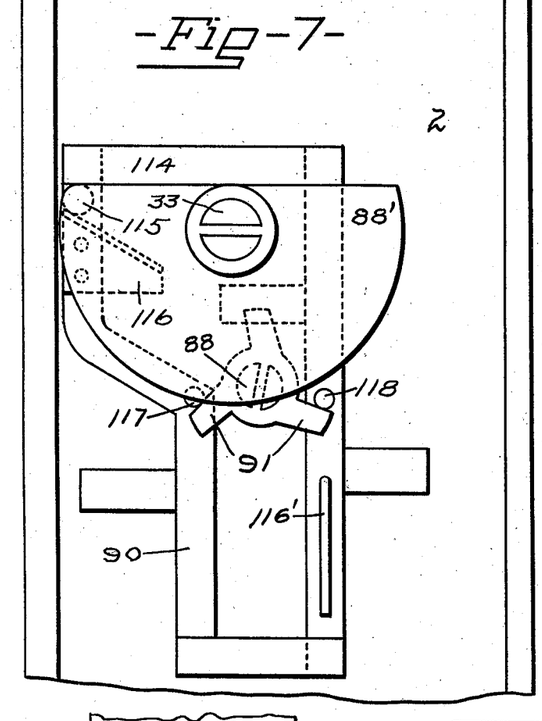
Figs. 7 and 8, Sheet 6, are detail views of the rotary key-locking-bar mechanism.
Figure 8:
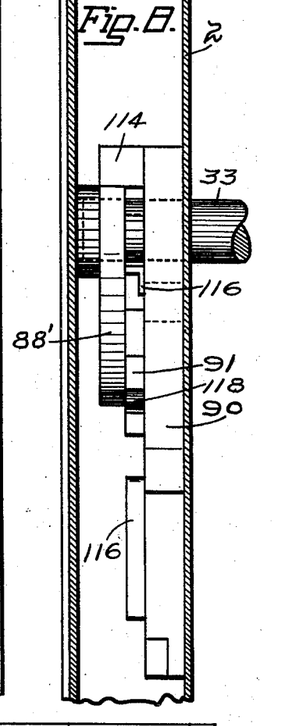

*Rotating locking-bar.*—Mounted above the interlocking members 87, as shown in Fig. 9, Sheet 7, is a rotating locking-bar 88, having three radial vanes or arms. (This locking-bar is the subject-matter of another application for Letters Patent and will be described briefly herein.) This bar receives movement from the main actuating-shaft 33 through the frame 90, mounted on the right-hand side of the frame 2. The frame 90 receives ascending movement from the cam 88' on shaft 33 striking the cross-bar 114 and descending movement by the pin 115 striking the projection 116. Mounted upon the end of the locking-bar 88 is a star-wheel having arms 91. Upon the ascension of frame 90 the projection 116' strikes the right-hand arm 91, and upon the descension of said frame the pin 117 strikes the left-hand arm 91 of said star-wheel. The pins 117 and 118, which are on the frame 90, lock the star-wheel in the position shown in Fig. 7, Sheet 6, and when said frame 90 is in its upward position the star-wheel is locked by two of its arms 91 engaging the projection 116'. The movement imparted to the locking-bar 88 by the frame 90 is substantially as that imparted to the rotary actuating-shafts 16 by the frame 28 on the left side of the machine.

113 (shown in Fig. 6, Sheet 5) designates a door which locks all of the oscillating shafts and rods upon which the various mechanisms are mounted. This door may be hinged or mounted to slide, as shown in the drawings. In Fig. 2, 114' designates the grooves in which the said door slides. There are two of such doors, and they provide outer inclosures of the ends of the shafts and rods on two sides of the machine.

I have omitted any illustration or description of the means for compelling a full stroke of the operating-lever, for the reason that it is not essential, and it forms subject-matter of a separate application.

*Operation by voter.*—Having described the structural features and the various movements thereof, I will now briefly describe the operation: When the voter enters the booth, the lever 34 is in its elevated position, as in Figs. 1 and 3, and upon entering he lowers said lever to the position shown in Fig. 2. This operation of the lever lowers the frame 28, which unlocks the keys, as previously described. The machine is now ready for the voter to select and set the desired keys. If he votes a straight ticket, he sets the desired key 51, and if he votes a mixed ticket he sets the desired keys 8. After setting the desired keys he raises the lever 34, which actuates the counters, resets the keys, and locks the same, as previously described. The voter then retires from the booth.

Having described my invention, I claim—

1. The combination with a rotating counter-actuator shaft having a counter-actuator rigidly secured thereto, of an independently-mounted setting-key freely movable into and out of a voting position and adapted to be engaged and actuated by said counter-actuator, of a counter adapted to be engaged and actuated by said setting-key, and means to actuate said rotating counter-actuator after said setting-key has been set into a voting position.

2. The combination with a rotating counter-actuator shaft having a counter-actuator rigidly secured thereto, of a setting-key freely movable into and out of a voting position, and adapted to be engaged and actuated by said counter-actuator, a counter adapted to be engaged and actuated by said setting-key, means to rotate said rotating counter-actuator, and means on said counter-actuator adapted to lock said counter.

3. The combination with a setting-key, of a counter, a rotating counter-actuator shaft having a counter-actuator rigidly secured thereto, means on said counter-actuator adapted to successively unlock said counter, engage and actuate said key thereby actuating said counter and finally locking said counter, and means to rotate said rotating counter-actuator.

4. The combination with an intermittent rotating counter-actuator shaft, a series of counter-actuators rigidly secured to said intermittent rotating counter-actuator, of a series of independently-mounted setting-keys adapted when set to be engaged and actuated by said counter-actuators, a series of counters adapted to be rotated by said setting-keys, and means to intermittently rotate said intermittent counter-actuator.

5. The combination with a series of setting-keys independently mounted, of a series of counters, an independently-mounted rotating shaft extending across said series of counters, of a series of counter-actuators secured to said rotating shaft adapted to engage and actuate said setting-keys and rotate said counters, an operating-lever, and connecting mechanism between said rotating shaft and said operating-lever.

6. The combination with an intermittent rotating shaft, a series of counter-actuators rigidly secured thereto, of a plurality of projections on each of said counter-actuators, a series of setting-keys one for each counter-actuator, said setting-keys being adapted to be set into the paths of said projections upon said counter-actuators, a series of counters adapted to be engaged and actuated by said setting-keys, and means to intermittently rotate said intermittent rotating shaft.

7. The combination with a plurality of rotating shafts, a series of counter-actuators rigidly secured to each of said rotating shafts, a plurality of series of setting-keys adapted to be engaged and actuated by said counter-actuators, of a plurality of series of counters adapted to be engaged and rotated by said setting-keys, a reciprocating actuating-frame adapted to actuate said rotating shafts simultaneously, and means to actuate said reciprocating actuating-frame.

8. In a voting-machine, the combination with a rotating counter-actuator shaft, of a series of counter-actuators rigidly secured thereto, of a series of setting-keys adapted to be engaged and actuated by said counter-actuator, a series of counters adapted to be engaged and actuated by said setting-keys, of an oscillating operating-lever, means to rotate said rotating counter-actuator a predetermined distance upon the operation of the operating-lever in one direction, and means to advance said rotating counter-actuator upon the actuation of the operating-lever in the reverse direction.

9. The combination with a rotating shaft, a series of counter-actuators rigidly secured thereto, of a series of setting-keys adapted to be engaged and actuated by said counter-actuators, a series of counters adapted to be engaged and actuated by said setting-keys, of an operating-lever, means to positively stop said rotating shaft after being rotated a predetermined distance by the operation of said operating-lever in one direction, and means to positively advance and lock said rotating shaft upon actuation of said operating-lever in the reverse direction.

10. In a voting-machine, the combination with a plurality of rotating shafts, a series of counter-actuators rigidly secured to said rotating shafts, a series of setting-keys adapted to be engaged and actuated by said counter-actuators, of a series of counters adapted to be engaged and actuated by said setting-keys, a reciprocating actuating-frame, means on said reciprocating actuating-frame adapted to positively actuate a plurality of said rotating shafts, an oscillating shaft, of an operating-lever mounted on said oscillating shaft, of means supported by said oscillating shaft adapted to positively actuate said reciprocating actuating-frame upon the actuation of said operating-lever in one direction, and means to positively return said reciprocating actuating-frame upon the operation of said operating-lever in the reverse direction.

11. The combination with a plurality of rotating shafts, a plurality of counter-actuators rigidly secured to each of said shafts, a plurality of setting-keys and their coöperating actuating-frames, and means on said counter-actuators, setting-key, and coöperating actuating-frames adapted to lock all unset keys, and means to rotate said rotating shafts.

12. In a voting-machine, the combination of a plurality of rotating shafts, a plurality of counter-actuators supported by each of said rotating shafts, a plurality of setting-keys and their coöperating actuating-frames, of means on said counter-actuators adapted to register all set keys, and means to lock all unset keys.

13. In a voting-machine, the combination with a plurality of rotating shafts, a plurality of counter-actuators rigidly secured to said rotating shafts, a plurality of setting-keys adapted to be engaged and actuated by said counter-actuators, a plurality of actuating-frames, of a plurality of counters, and means to lock said counter of the unset keys.

14. The combination with a series of setting-keys independently mounted, of a straight-ticket key mechanism independently mounted and adapted to engage and set a series of said setting-keys simultaneously, a series of counters adapted to be engaged and actuated by said setting-keys, of a rotating shaft, a series of counter-actuators rigidly secured to said rotating shaft, means on said counter-actuators adapted to engage and actuate said series of setting-keys, and means to rotate said rotating shaft.

15. In a voting-machine, the combination with a setting-key, of a counter adapted to be engaged and rotated by said setting-key, of a movable stop adapted to positively limit the stroke of said setting-key, a rotating shaft, a counter-actuator rigidly secured to said rotating shaft, and means to rotate said rotating shaft.

16. In a voting-machine, the combination with a rotating counter-actuator, of a counter normally locked by said rotating counter-actuator, a setting-key adapted to actuate said counter when actuated by said rotating counter-actuator, means to actuate said rotating counter-actuator, and means to return a set key to normal, whereby said key is registered and returned to normal.

17. In a voting-machine, the combination of a rotating shaft, a counter-actuator mounted thereon and having a plurality of projections from its side, an actuating-frame adapted to be locked by one of said projections on said counter-actuator, and a setting-key adapted to be locked by said actuating-frame, and means to rotate said counter-actuator.

18. In a voting-machine, the combination of a rotating shaft, a counter-actuator mounted thereon and having a plurality of locking projections on its side, an actuating-frame adapted to be locked by said projections on the counter-actuator, a setting-key adapted to be locked by said actuating-frame, and a counter by said setting-key, and means to rotate said counter-actuator.

19. The combination with an independently-mounted oscillating shaft having a longitudinal channel therein, a straight-ticket key mounted on said oscillating shaft, a series of setting-keys independently mounted having setting projections 49 thereon, said projections 49 being adapted to be engaged by one of the sides of said longitudinal channel in said setting-keys, whereby a series of said setting-keys are simultaneously set.

20. In a voting-machine, the combination with a setting-key adapted to be moved from normal to a set position or to be returned to normal at will without actuating its corresponding counter, of a counter, and a movable stop normally locked and adapted to positively stop said setting-key after it has been moved a predetermined distance, and a rotating shaft having a counter-actuator rigidly secured thereto and adapted to release said movable stop and actuate said key and counter and finally lock said counter.

21. In a voting-machine, the combination with an interlocking mechanism, of a setting-key adapted to actuate said interlocking mechanism, of a counter normally locked, a rotating shaft having a counter-actuator rigidly secured thereto and adapted to lock said counter, and a unit-wheel of said counter and its coöperating mechanism arranged to positively limit the stroke of said setting-key and interlocking mechanism.

22. In a voting-machine, the combination of a suitable supporting-frame, of a plurality of division-plates having split bearings therein, a plurality of rotating counter-actuators movable into and out of said split bearings, and a single means to lock said split bearings simultaneously.

23. In a voting-machine, the combination with a suitable supporting-frame, of a plurality of division-plates removably mounted thereon, a plurality of slotted cross-bars secured to said supporting-frame, each of said division-plates occupying one of said slots, means on said cross-bars and division-plates adapting them to be coupled, and a plurality of rods to couple said cross-bars and division-plates, and a door to hold said rods in position.

24. In a voting-machine, the combination with a suitable supporting-frame, of a plurality of oscillating shafts extending across said supporting-frame and supported thereby, a plurality of setting-keys removably mounted on said shafts, an actuating member slid on each of said shafts but prevented from rotating, and a door to prevent said shaft from moving longitudinally.

25. In a voting-machine, the combination with a suitable supporting-frame, of a plurality of oscillating shafts, each having a longitudinal channel therein, said shafts extending across said supporting-frame, a straight-ticket key slid on each of said shafts but prevented from rotating, and a door to prevent said shafts from moving longitudinally.

26. In a voting-machine, the combination of a key adapted to be moved from normal to a set position or to be returned to normal at will, of a movable stop normally locked to positively stop the key when it has been moved a predetermined distance, a rotating shaft and a counter-actuator rigidly secured thereto and adapted to release said stop and actuate said key and counter successively.

27. In a voting-machine, the combination with a key adapted to be moved from a normal position to a set position and returned to said normal position at will, of a movable stop normally locked to positively stop the key when it has been moved a predetermined distance, and an intermittently-rotating shaft, and a counter-actuator rigidly secured thereto, and a plurality of projections on said counter-actuator adapted to release said stop and to actuate said key and said stop successively.

28. In a voting-machine, the combination with a setting-key, means to return said setting-key to normal, of a counter adapted to positively limit the stroke of said setting-key, a rotating shaft, a counter-actuator rigidly secured to said rotating shaft, said counter-actuator being adapted to engage and actuate said setting-key, a reciprocating frame, an operating-lever, and connecting mechanism between said reciprocating frame and operating-lever.

29. The combination with a suitable supporting-frame, of an oscillating shaft supported by said frame, a cam secured to said oscillating shaft, of an operating-lever also secured to said oscillating shaft, a reciprocating actuating-frame having actuating and locking projections thereon, a plurality of rotating shafts, a series of counter-actuators rigidly secured to each of said rotating shafts, a plurality of series of counters adapted to be locked or unlocked by said counter-actuators.

In testimony whereof I affix my signature in presence of two witnesses.

PHILIP YOE.

Witnesses:
R. J. McCarty,
C. M. Theobald.